US012116834B1

(12) United States Patent
Westbrook

(10) Patent No.: US 12,116,834 B1
(45) Date of Patent: Oct. 15, 2024

(54) DRAFT BLOCKER FOR A DOOR

(71) Applicant: Michael Westbrook, Laguna Beach, CA (US)

(72) Inventor: Michael Westbrook, Laguna Beach, CA (US)

( * ) Notice: Subject to any disclaimer, the term of this patent is extended or adjusted under 35 U.S.C. 154(b) by 0 days.

(21) Appl. No.: 18/214,959

(22) Filed: Jun. 27, 2023

(51) Int. Cl.
*E06B 7/00* (2006.01)
*E06B 7/23* (2006.01)

(52) U.S. Cl.
CPC .......... *E06B 7/2316* (2013.01); *E06B 7/2314* (2013.01)

(58) Field of Classification Search
CPC ............................. E06B 7/2316; E06B 7/2314
USPC ... 49/70, 469, 470, 303, 304, 305, 306, 307, 49/309, 310, 311, 312, 313, 314, 315, 49/316, 317, 318, 319, 320, 321
See application file for complete search history.

(56) References Cited

U.S. PATENT DOCUMENTS 3,855,731 A * 12/1974 Yerkes ...................... E06B 7/28 49/314
4,611,429 A 9/1986 Kanies
5,475,948 A 12/1995 Parke
6,082,047 A 7/2000 Comaglio et al.
6,105,313 A * 8/2000 Holloway ............. E05C 19/001 49/318
8,161,685 B2 4/2012 Salgado
8,595,984 B1 12/2013 Wells
8,925,250 B2 1/2015 Parker
9,951,554 B1 4/2018 Beckner
2009/0077895 A1* 3/2009 Tshai ...................... E06B 7/215 49/357
2015/0000198 A1* 1/2015 Takahashi ................ F24F 11/00 49/276
2017/0260799 A1* 9/2017 Siller ........................ E06B 7/18

* cited by examiner

*Primary Examiner* — Jerry E Redman
(74) *Attorney, Agent, or Firm* — Cramer Patent & Design PLLC; Aaron R. Cramer

(57) ABSTRACT

A draft blocker device for a door that also includes an air stopper may be included in certain embodiments of the present disclosure. A frame attachment that is fastened to a first end of the air stopper might also be included in certain embodiments. In certain implementations, there is additionally a handle attachment that is coupled to a second end of the air stopper. This handle attachment may contain a handle coupler. Adjustability along the longitudinal axis of the handle attachment is possible in certain implementations. A hook that can be detached from its attachment to a doorknob might serve as the handle coupler in various implementations of the invention.

15 Claims, 7 Drawing Sheets

DRAFT BLOCKER FOR A DOOR

FIELD OF THE INVENTION

The present invention relates generally to a draft blocking device and more specifically to a draft blocking device for a bottom door crevice having improved features.

RELATED APPLICATIONS

None.

BACKGROUND OF THE INVENTION

In our nation, the consumption of energy as well as the use of other utilities is increasing on a daily basis. Recent news stories that have shown soaring electricity bills, rolling blackouts, increases in the price of natural gas, and shortages are unmistakable indications that we need to cut down on our usage of these valuable natural resource goods. When it comes to the outside of our house, the door frame seal regions, particularly at the threshold, are notorious for allowing significant amounts of energy to escape.

When the materials that make up door thresholds age, when houses settle, and when thresholds get worn, it becomes easier for hot or cold air to enter a home, which not only results in uncomfortable temperatures but also adds to the expense of heating and cooling the home. In order to combat these drafts, a lot of homes will install something called a draft blocker, which is just an insulated cloth cylinder that runs down the whole bottom edge of the door. These draft stoppers, although undoubtedly useful, must be relocated every time the door is opened and then adjusted every time it is closed. This extra labor gets annoying very fast, and as a result, many people just stop using the draft blocker.

Therefore, there is a need for a device by which the functionality of a draft blocker may be accomplished without the requirement of moving it and repositioning it every time the door is opened and closed. This need was satisfied with the production of the draft blocker for a door.

SUMMARY OF THE INVENTION

Embodiments of the present disclosure may include a draft blocker device for a door including an air stopper. Embodiments may also include a frame attachment secured to a first end of the air stopper. Embodiments may also include a handle attachment secured to a second end of the air stopper including a handle coupler. In some embodiments, the handle attachment may be lengthwise adjustable. In some embodiments, the handle coupler may be a hook capable of being removably secured about a doorknob.

In some embodiments, the air stopper may be detachably coupled to the bottom inside of a door and rests on a floor to prevent air from passing through a gap at the bottom of the door. In some embodiments, the air stopper may be secured to a door frame on a hinge side of the door by the frame attachment. In some embodiments, the air stopper may be secured to the door on a handle side of the door by the handle attachment.

In some embodiments, the air stopper may be pushed into a room by the door as the door opens. In some embodiments, the air stopper self-positions against the door as the door closes by virtue of the handle attachment pulling the air stopper with the door. In some embodiments, the air stopper may be a baffle that blocks the flow of air through the gap under the door.

In some embodiments, the air stopper may be substantially the same width as the door. In some embodiments, the air stopper may be taller than the height of the gap such that the gap may be covered by the air stopper. In some embodiments, the air stopper extends above the gap such that the door may push the air stopper as the door pivots open.

In some embodiments, the shape of the air stopper may be a rectangular cuboid. In some embodiments, the top of the rear side of the air stopper may include an adhesive strip that retains the air stopper to the door. In some embodiments, the adhesive strip may include a backing material to cover the adhesive strip prior to use.

In some embodiments, the bottom surface of the air stopper may be padded to slide easily over the floor without marring the floor. In some embodiments, the air stopper may include a foam core covered by an outer fabric layer. In some embodiments, the frame attachment detachably couples the hinge side of the air stopper to the door frame.

In some embodiments, the frame attachment prevents the air stopper from being pushed away from the door as the door opens and prevents the air stopper from sliding parallel to the door in a direction towards the handle side of the door. In some embodiments, the frame attachment may include a mounting tab that extends laterally from the hinge side of the air stopper. In some embodiments, the mounting tab detachably couples to the door frame via a hook-and-loop fastener. In some embodiments, the hinge side of the air stopper may be retained to the door frame by the hook portion of the hook-and-loop fastener engaging the loop portion of the hook-and-loop fastener.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
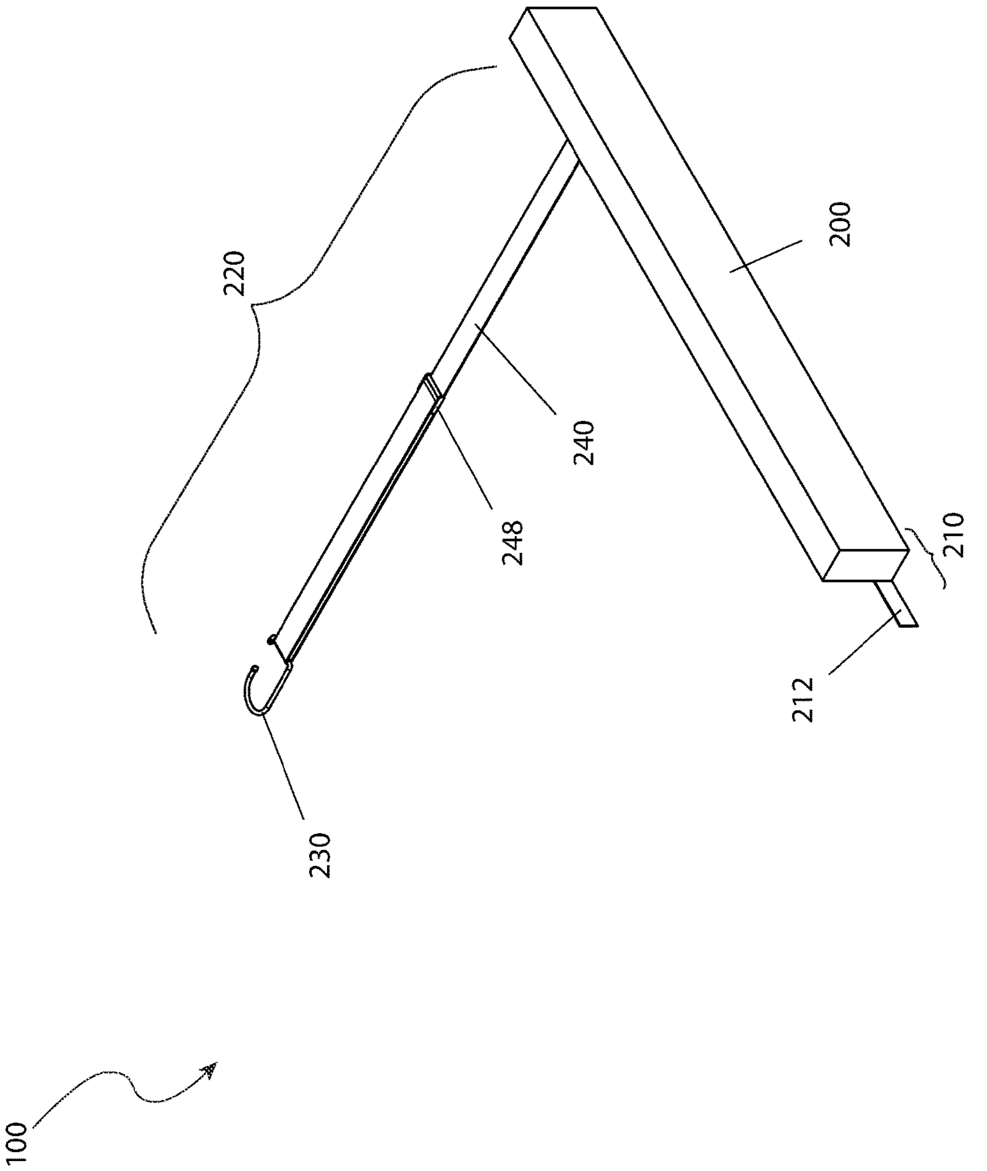
FIG. 1 is a front isometric view of a draft blocker for a door 100, according to an embodiment of the present device.
Figure 2:
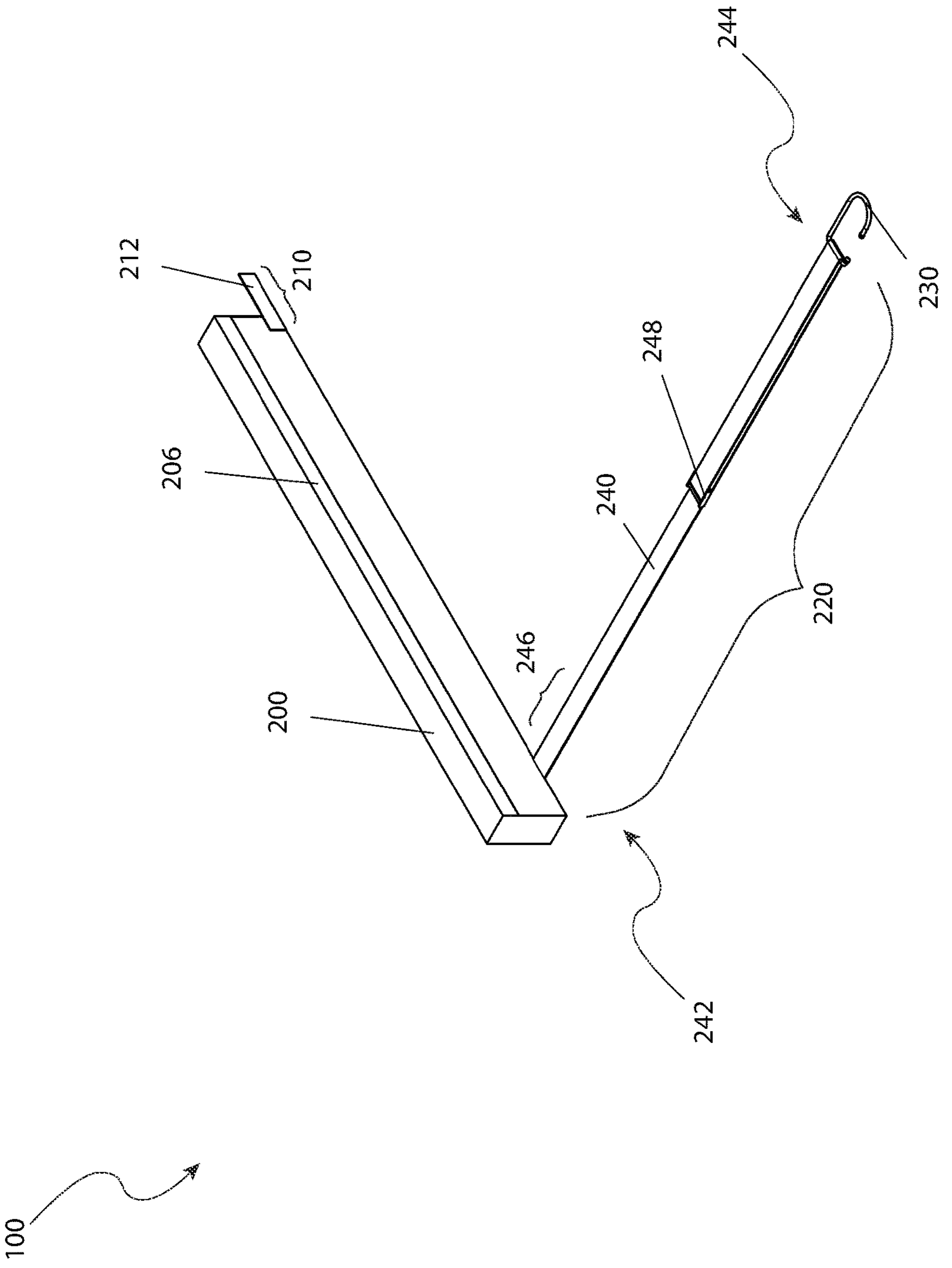
FIG. 2 is a rear isometric view of a draft blocker for a door 100, according to an embodiment of the present device.
Figure 3:
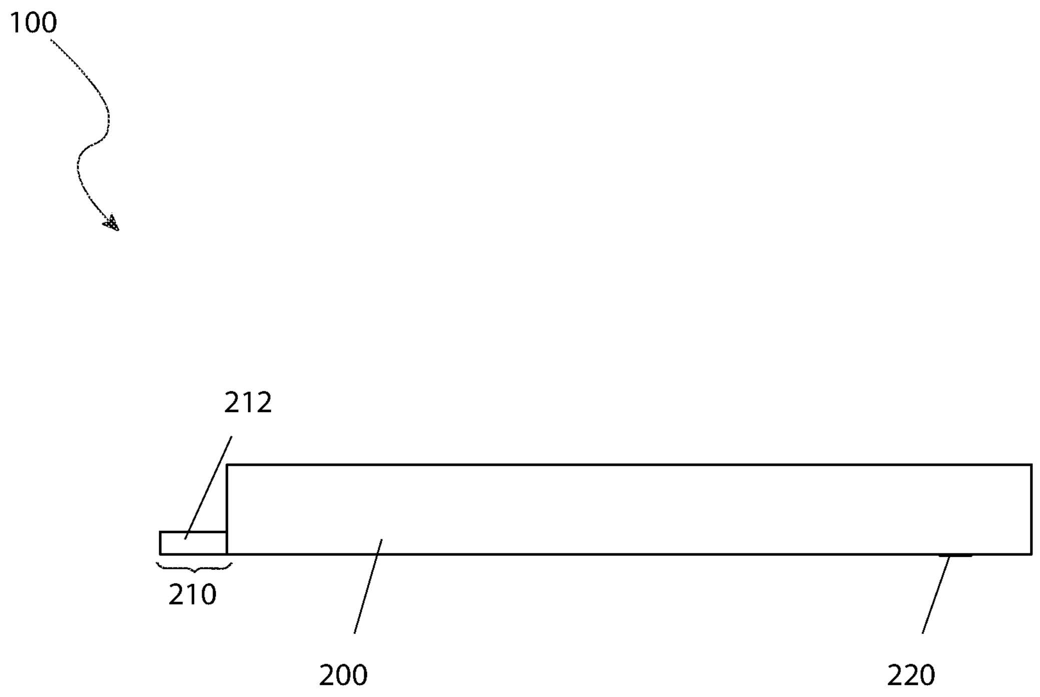
FIG. 3 is a front view of a draft blocker for a door 100, according to an embodiment of the present device.
Figure 4:
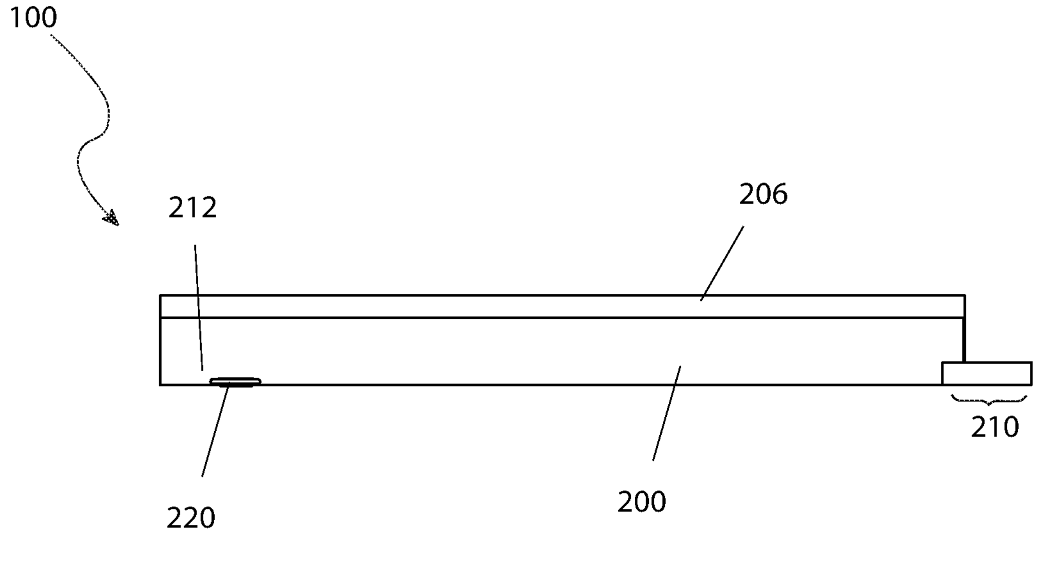
FIG. 4 is a rear view of a draft blocker for a door 100, according to an embodiment of the present device.
Figure 5:
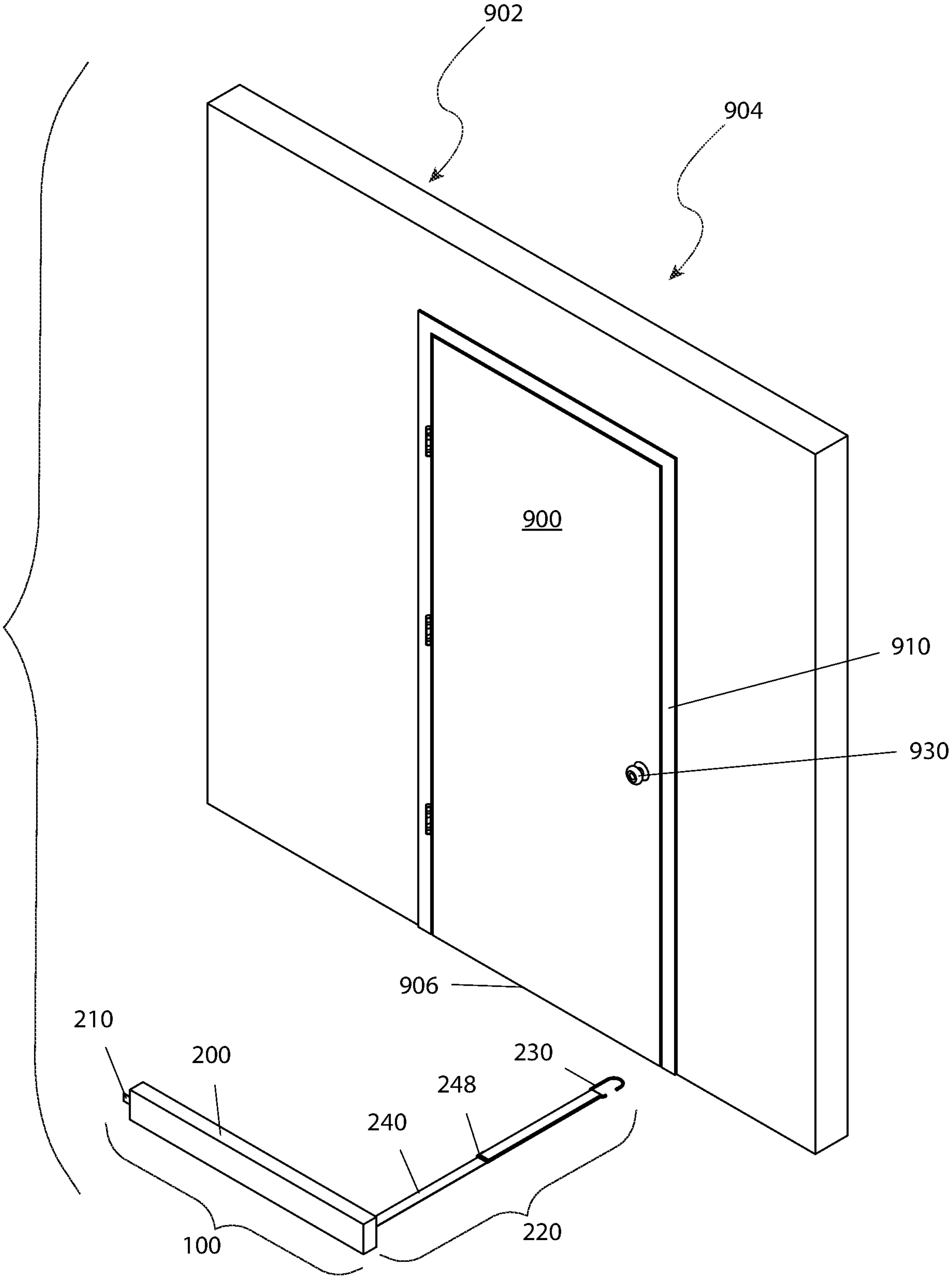
FIG. 5 is a front isometric in-use view of a draft blocker for a door 100, according to an embodiment of the present device, illustrating the draft blocker for a door 100 positioned in preparation for installation on a door 900.
Figure 6:
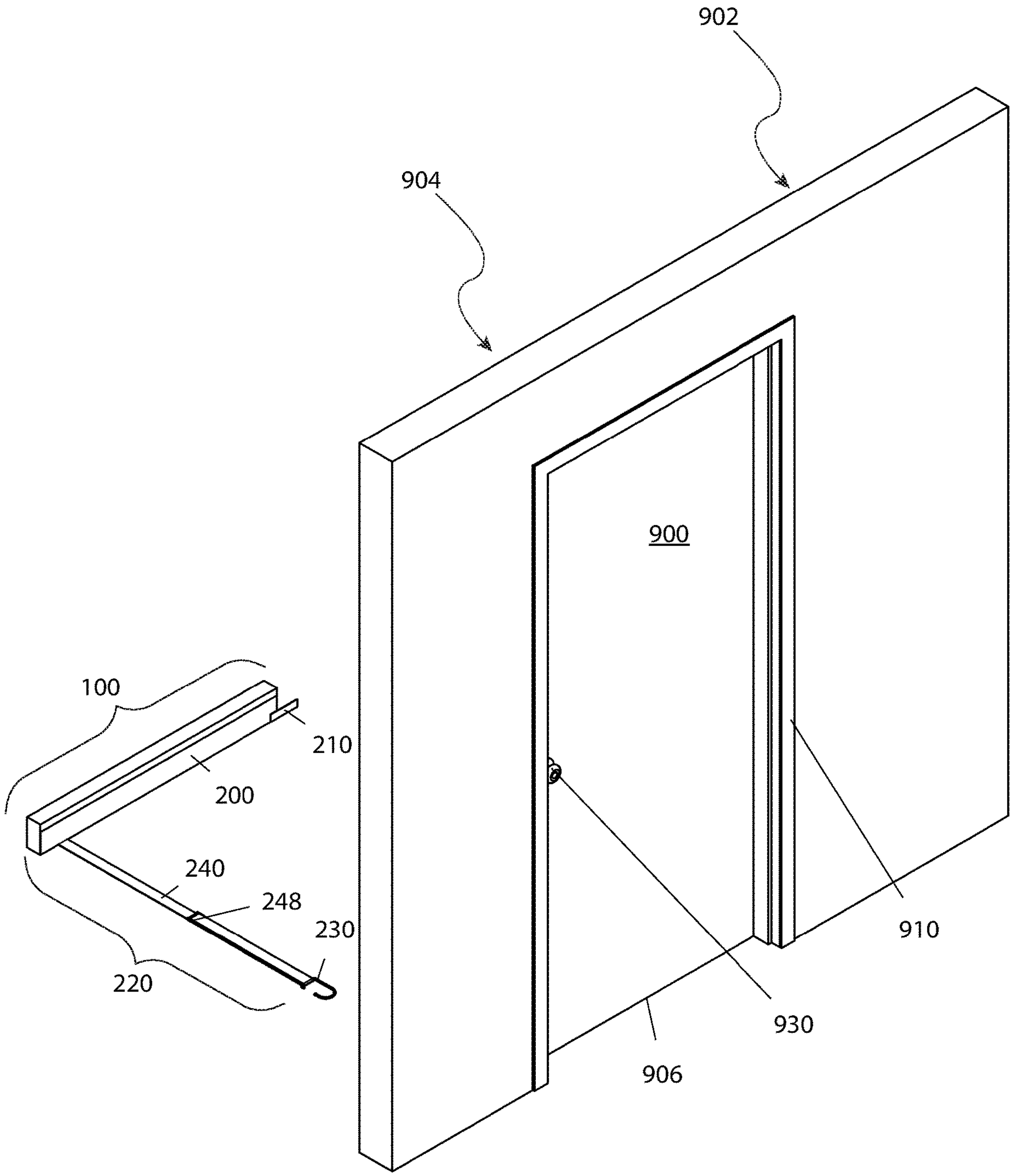
FIG. 6 is a rear isometric in-use view of a draft blocker for a door 100, according to an embodiment of the present device, illustrating the draft blocker for a door 100 positioned in preparation for installation on a door 900.
Figure 7:
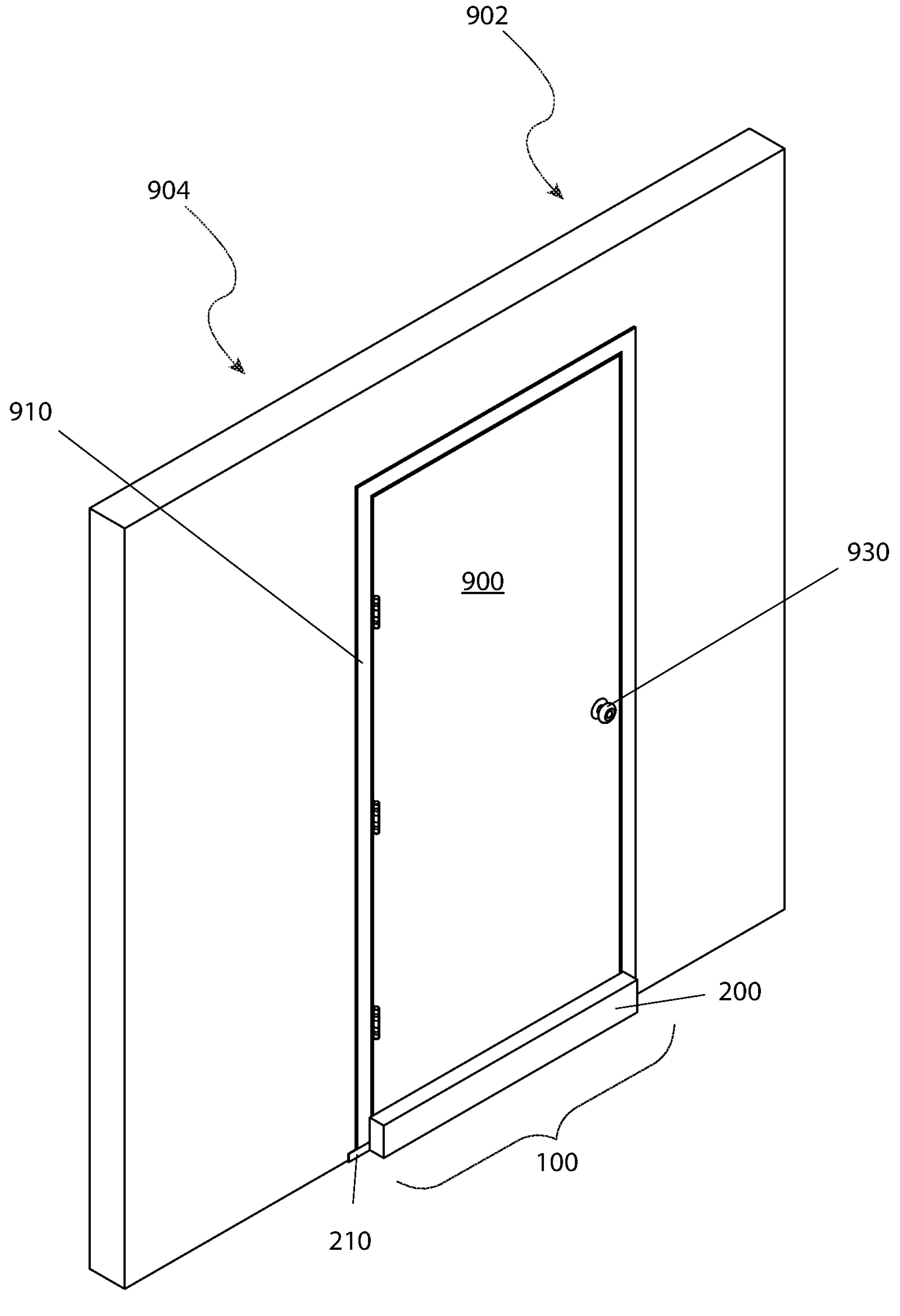
FIG. 7 is a front isometric in-use view of a draft blocker for a door 100, according to an embodiment of the present device, illustrating the draft blocker for a door 100 installed on a door 900; and, FIG. 8 is a rear isometric in-use view of a draft blocker for a door 100, according to an embodiment of the present device, illustrating the draft blocker for a door 100 installed on a door 900.
Figure 8:
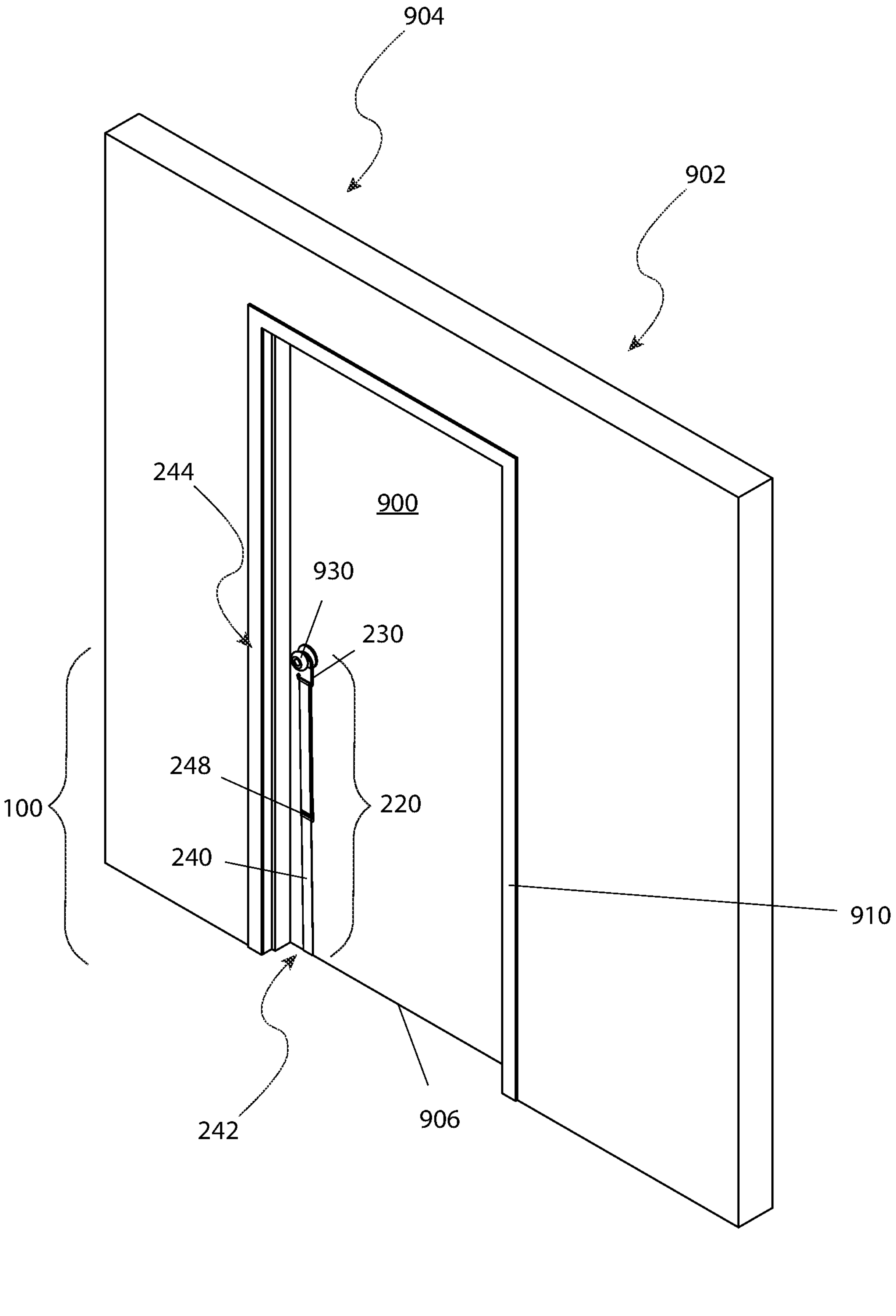

100 draft blocker for a door
200 air stopper

206 adhesive strip
210 frame attachment
212 mounting tab
220 handle attachment
230 handle coupler
240 strap
242 bottom end
244 top end
246 under door portion
248 length adjuster
900 door
902 hinge side
904 handle side
906 gap
910 door frame
930 handle

DESCRIPTION OF THE DEVICE

The present device is directed to a draft blocker for a door (herein also described as a "device") 100. The draft blocker for a door 100 may comprise an air stopper 200, a frame attachment 210, and a handle attachment 220. The air stopper 200 may be detachably coupled to the bottom inside of a door 900 and may rest on a floor to prevent air from passing through a gap 906 at the bottom of the door 900. The air stopper 200 may be secured to a door frame 910 on a hinge side 902 of the door 900 by the frame attachment 210. The air stopper 200 may be secured to the door 900 on a handle side 904 of the door 900 by the handle attachment 220. The air stopper 200 may be pushed into a room by the door 900 as the door 900 opens. The air stopper 200 may self-position against the door 900 as the door 900 closes by virtue of the handle attachment 220 pulling the air stopper 200 with the door 900.

The air stopper 200 may be a baffle that blocks the flow of air through the gap 906 under the door 900. The air stopper 200 may be positioned against the door 900 at the bottom inside of the door 900 and may rest on the floor. The air stopper 200 may be substantially the same width as the door 900. The air stopper 200 may be taller than the height of the gap 906 such that the gap 906 may be covered by the air stopper 200. The air stopper 200 may extend above the gap 906 such that the door 900 may push the air stopper 200 as the door 900 pivots open. In a preferred embodiment, the shape of the air stopper 200 may be a rectangular cuboid.

In some embodiments, the top of the rear side of the air stopper 200 may comprise an adhesive strip 206 that may retain the air stopper 200 to the door 900. The adhesive strip 206 may comprise a backing material to cover the adhesive strip 206 prior to use.

In some embodiments, the bottom surface of the air stopper 200 may be padded such that the air stopper 200 slides easily over the floor without marring the floor. In some embodiments, the air stopper 200 may comprise a foam core covered by an outer fabric layer.

The frame attachment 210 may detachably couple the hinge side 902 of the air stopper 200 to the door frame 910. The frame attachment 210 may prevent the air stopper 200 from being pushed away from the door 900 as the door 900 opens and may prevent the air stopper 200 from sliding parallel to the door 900 in a direction that is towards the handle side 904 of the door 900. The frame attachment 210 may comprise a mounting tab 212 that may extend laterally from the hinge side 902 of the air stopper 200. As a non-limiting example, the mounting tab 212 may detachably couple to the door frame 910 via a hook-and-loop fastener. By way of example and not of limitation, a loop portion of the hook-and-loop fastener may couple to the door frame 910 via a self-adhesive backing and a hook portion of the hook-and-loop fastener may be coupled to the mounting tab 212. The hinge side 902 of the air stopper 200 may be retained to the door frame 910 by the hook portion of the hook-and-loop fastener engaging the loop portion of the hook-and-loop fastener.

The handle attachment 220 may comprise a handle coupler 230 and a strap 240. The handle attachment 220 may detachably couple the handle side 904 of the air stopper 200 to the door 900. The strap 240 may be coupled to the air stopper 200 and to the handle coupler 230. The strap 240 may pass under the door 900 via the gap 906 and may detachably couple to the front of the door 900 via a handle 930, a knob, other door hardware, or any combination thereof. Note that throughout the remainder of this document references to the handle 930 are intended to include the handle 930, the knob, the other door hardware, or any combination thereof.

The handle coupler 230 may be coupled to the strap 240. The handle coupler 230 may be configured to detachably couple to the front of the door 900 via the handle 930. As non-limiting examples, the handle coupler 230 may comprise a hook, a ring, a clip, or any combination thereof.

The strap 240 may be a flexible strip made from one or more materials. A bottom end 242 of the strap 240 may be coupled to the handle side 904 of the air stopper 200. A top end 244 of the strap 240 may be coupled to the handle coupler 230. The length of the strap 240 may be at least one half of the height of the door 900 such that the strap 240 may reach from the air stopper 200 at the inside bottom of the door 900, under the door 900, and up the front of the door 900 to the handle 930.

In some embodiments, the strap 240 may comprise a length adjuster 248. The length adjuster 248 may be configured to tighten and loosen the strap 240. As a non-limiting example, the length adjuster 248 may be a tri-bar adjustable webbing slider.

In some embodiments, the strap 240 may comprise one or more decorative elements. As non-limiting examples, the one (1) or more decorative elements may comprise braided materials, one or more colors or patterns of colors, surface texture, or any combination thereof. In some embodiments, the strap 240 may be reinforced by nylon for increased strength. In some embodiments, an under door portion 246 of the strap 240 may be made thinner than the remainder of the strap 240 to avoid interference for the operation of the door 900.

In use, the air stopper 200 may be placed along the inside bottom of a door 900 while the door 900 is closed and the frame attachment 210 may be coupled to the hinge side 902 of the door frame 910. In some embodiments, coupling the air stopper 200 to the door 900 may involve pressing the adhesive strip 206 located at the top rear of the air stopper 200 onto the door 900. In some embodiments, coupling the frame attachment 210 to the door frame 910 may involve removing a backing from the loop portion of a hook and loop fastener and adhering the loop portion to the door frame 910, then pressing the hook portion onto the loop portion such that a mounting tab 212 is coupled to the door frame 910. The door 900 may then be partially opened to facilitate the following steps. The strap 240 may be passed under the door 900 and the top end 244 of the strap 240 may be pulled up towards the handle 930. The handle coupler 230 may be detachably coupled to the handle 930. In some embodiments, the length adjuster 248 may be used to loosen the strap 240 if necessary to place the handle coupler 230 into the handle 930. The length adjuster 248 may be used to tighten the strap 240 after coupling the handle coupler 230 to the handle 930.

Once in position against the inside bottom of the door 900, the air stopper 200 may prevent air from flowing through a gap 906 located under the door 900. As the door 900 is opened, the door 900 may push the air stopper 200 into the room. As the door 900 is closed, the strap 240 may pull the handle side 904 of the air stopper 200 back to the original position of the air stopper 200 at the inside bottom of the door 900. The frame attachment 210 may retain the hinge side 902 of the air stopper 200 in position.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A draft blocker device for a door comprising:

an air stopper;

a frame attachment secured to a first end of the air stopper; and, a handle attachment secured to a second end of the air stopper comprising:

a handle coupler; and, wherein the handle attachment is lengthwise adjustable; and, wherein the handle coupler comprises a hook capable of being removably secured about a doorknob.

2. The draft blocker device of claim 1, wherein the air stopper is detachably coupled to the bottom inside of a door and rests on a floor to prevent air from passing through a gap at the bottom of the door.

3. The draft blocker device of claim 2, wherein the air stopper is secured to a door frame on a hinge side of the door by the frame attachment.

4. The draft blocker device of claim 3, wherein the air stopper is secured to the door on a handle side of the door by the handle attachment.

5. The draft blocker device of claim 4, wherein the air stopper is pushed into a room by the door as the door opens.

6. The draft blocker device of claim 5, wherein the air stopper self-positions against the door as the door closes by virtue of the handle attachment pulling the air stopper with the door.

7. The draft blocker device of claim 6, wherein the air stopper is a baffle that blocks the flow of air through the gap under the door.

8. The draft blocker device of claim 7, wherein the air stopper is substantially a same width as the door.

9. The draft blocker device of claim 8, wherein the air stopper is taller than a height of the gap such that the gap is covered by the air stopper.

10. The draft blocker device of claim 9, wherein the air stopper extends above the gap such that the door may push the air stopper as the door pivots open.

11. The draft blocker device of claim 10, wherein the shape of the air stopper is a rectangular cuboid.

12. The draft blocker device of claim 11, wherein the top of the rear side of the air stopper comprises an adhesive strip that retains the air stopper to the door.

13. The draft blocker device of claim 12, wherein the frame attachment detachably couples the hinge side of the air stopper to the door frame.

14. The draft blocker device of claim 13, wherein the frame attachment prevents the air stopper from being pushed away from the door as the door opens and prevents the air stopper from sliding parallel to the door in a direction towards the handle side of the door.

15. The draft blocker device of claim 13, wherein the frame attachment comprises a mounting tab that extends laterally from the hinge side of the air stopper.

* * * * *